Aug. 19, 1952  F. W. CHESAK  2,607,210
KEY HOLDER
Filed Aug. 16, 1949
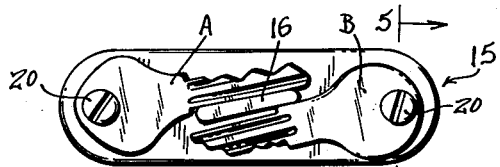
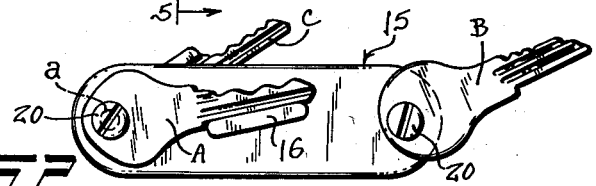
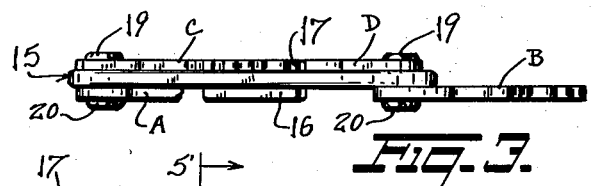
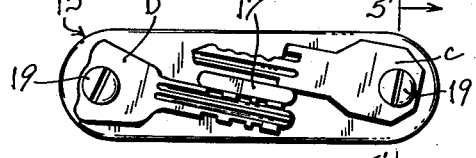
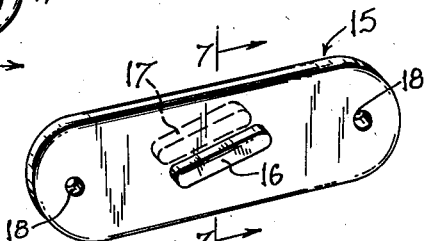
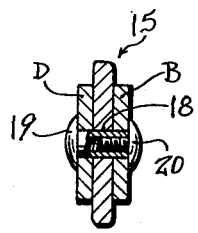
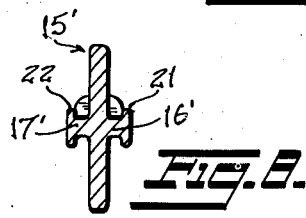
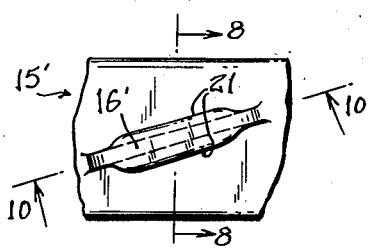
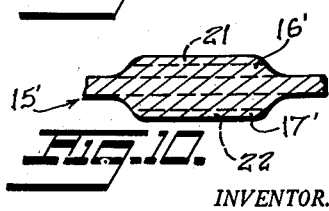
INVENTOR.
FRANK W. CHESAK
BY
ATTORNEY Patented Aug. 19, 1952

2,607,210

UNITED STATES PATENT OFFICE 2,607,210

KEY HOLDER

Frank W. Chesak, Woodside, N. Y.

Application August 16, 1949, Serial No. 110,602

1 Claim. (Cl. 70—456)

This invention relates to new and useful improvements in key holders; and, more particularly, the aim is to provide a novel and valuable key holder which may practicably be made for carrying a plurality of keys, for instance the four keys ordinarily importantly appropriate to the different locks on a passenger automobile, and which, at the same time, may have, among others, all the advantageous features now to be enumerated.

While the new device may carry a relatively large number of different keys, regardless of the kind of locks with which they are to coact, nevertheless the holder may consists solely of a main structure which in its entirety is a single member, such, for example, as an easily and inexpensively molded one. Although the invention is not to be limited to a molded such member, or one molded of a plastic material, the now preferred nature of said member is that it is a single plastic molded piece.

One of the reasons for this preference is because, particularly with said member molded of a plastic, the cost of manufacture thereof can be held down to a trifling amount; another reason is that with said member made of plastic it can be at once strong yet light in weight; and another reason is that with said member made of plastic the new key holder may readily be supplied in different colors, and also, if desired, so as to have a fluorescent property to permit ready finding if accidentally dropped in the dark.

Furthermore, since, in addition to said main member, the new holder, in its now favored form, includes solely a pair of thread equipped mounting means for the keys, with each of these mounting means desirably consisting of a pair of male and female screws to avoid having to tap holes through the main member yet permit screw means to be included in said mounting means, these male and female screws are of inconsiderable cost, as they can be made on a standard automatic screw machine at exceedingly high rates of production.

Again, by virtue of the features already mentioned, the said main member, having even a four-key capacity, is hardly as large as an ordinary fair-size penknife, and so conveniently portable in the pocket or in a lady's hand-bag; the keys may be readily attached and detached, as for substituting in the holder a new key for one previously therein; and the plural-screw mounting means can be made, as will become clear hereinbelow, in such ways that they are readily manipulable, without the aid of a special tool or even an ordinary screw driver, or the attachment or detachment of a key, for normally adequately dependably holding all the keys wholly retracted within the bounds of said main member, and for allowing a particular selected key to be swung out for use at any time desired. Besides, a key does not have to be picked at, perhaps to damage a finger nail, in order to project such key; nor, on the other hand, need there be present such complexities as push-buttons, snap latches and the like.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 face elevationally illustrates one now favored embodiment of the invention, this designed for holding four keys, and with all said four keys, here assumed to be in the holder, in retracted positions.

Fig. 2 shows the parts as in Fig. 1, but now with two of the keys in partially projected positions, as preparatory to use.

Fig. 3 is a top plan view of the parts, arranged as in Fig. 2.

Fig. 4 is a view similar to Fig. 1, but looking at the side of the device remote from the observer in Fig. 1.

Fig. 5 is a considerably enlarged transverse sectional detail view, taken on the line 5—5 of Fig. 1; which view also may be taken, provided the reference numerals applied in this view to keys and mounting screw elements be ignored, as representing a section taken on the line 5'—5' of Fig. 4.

Fig. 6 shows in perspective the main member of Figs. 1-4, drawn to a scale enlarged slightly over that of the last-named views.

Fig. 7 is a detail section taken on the line 7—7 of Fig. 6.

Fig. 8 is a view similar to Fig. 7, but taken on the line 8—8 of Fig. 9; these Figs. 8 and 9, and also Fig. 10, being illustrative of a modification.

Fig. 10 is a section taken on the line 10—10 of Fig. 9.

Referring now to the drawings more in detail, by reference numerals, the said main member is as a whole designated 15; and the holder, as already stated, is shown as designed for carrying four keys. These keys are respectively indicated at A, B, C and D.

The main member 15 as will be observed is merely an elongate plate, desirably with semicircularly rounded ends as shown.

This plate integrally carries a pair of rib-form projections, one aligned with the other, but with one, the rib 16, on one side of the plate, and the other, the rib 17, on the other side of the plate. Said ribs are located midway along the length of the member 15, with lines of extension oblique relative to the direction of elongation of the plate.

This oblique direction of extension of the ribs 16 and 17 is such, as will be noted from the drawings, that, with the keys A, B, C and D of the so-called Yale-lock type illustrated (that is, of the flat and grooved kind with one long edge specially milled and with this milled edge opposite a long straight edge), four keys may be placed wholly within the bounds of the plate when said two keys are arranged as shown in Fig. 1 or 4 to have their long straight edges flat against the opposite sides of the ribs 16 and 17. Then, nevertheless, the width of the plate need not appreciably exceed the maximum width of the usual rounded apertured head of a key, while the length of the plate may be kept down to less than one and one-third the length of either key.

In said type of key the said aperture at its head is a circular one placed centrally thereof, and of a diameter of about that indicated in broken lines at a in Fig. 2.

In agreement with the location of such aperture of the key A and of the corresponding aperture of the key B (as such locations are shown in Fig. 1), two cylindrical holes 18, 18 are provided near the ends of the main member 15; these for coaction with the aforesaid special mounting means now to be described in detail.

Both said two mounting means are alike, and a detailed description of one will suffice as a description of both. As shown best in Fig. 5, such a mounting means consists merely of two screws, one a female screw 19, that is, a screw with a cylindrical hollow shank internally threaded; and a complementary male or ordinary screw, 20, with its shank carrying an external thread matching the internal thread of the screw 19.

The external diameter of the shank of said screw 19 is such as to pass easily without unnecessary play through an aperture 18. Then, with the diameters of said apertures substantially the same as the diameter of the aperture (as the aperture 18) through the head of a key, all four keys may be independently rotatively mounted on the main member 15, yet without sloppiness of pivoting, merely by applying the two mounting means as shown.

Now to explain a feature mentioned early herein, i. e., the manipulable efficacy of the mounting means for attaining a number of useful results: This feature is the fact that the kerf or transverse slot across the head of each screw element 19 and 20 of a mounting means 19—20 is of a width about that of the five cent coin or nickel, and of a depth such that whichever of a nickel, penny or dime is most handy at any time, even in the dark as at night and outdoors, that coin may be used screw-driver fashion when inserted into such a slot. Always, or at least substantially always, at least one of such coins is in the pocket of the one desiring to free a particular key.

A very slight loosening of either mounting means 19—20, by the use of such a coin, is sufficient to release the normally maintained friction grip on the associated two keys, and then the desired one of that pair of keys may be swung out to projection for use without risking damage to a finger nail.

When the desired key or keys have been used as desired, and, following a swing back of either or both to retraction within the bounds of the main member 15, as shown in Figs. 1 and 4, a coin has been used to slightly tighten up the previously loosened mounting means, all the keys are frictionally held so as to be dependably retained retracted, and thus are prevented from casually becoming projected to become entangled with other objects in, or to damage the lining, of a pocket or hand-bag.

Referring to the modification illustrated in Figs. 8–10, here the parts to which are applied reference numerals with primes added correspond, respectively, to the parts to which have been applied the same reference numerals but without primes. As will be noted, here the ribs 16' and 17' are shown as having generally straight-line crest portions, with the crest portion of the rib 16' attended along both opposite sides by a flange formation 21, and with the crest portion of the rib 17' similarly attended, as at 22. Otherwise stated, the said ribs are here shown as T-shaped in cross-section; thereby providing four pocketing recesses one for each of four keys such as the keys A, B, C and D.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A one-piece key-holder comprising an elongated plate of a length greater than a key, parallel elongated projections integrally formed on the opposed faces of said plate intermediate the ends thereof, said projections being extended at an oblique angle to the direction of elongation of said plate, said plate having apertures at the ends thereof on the longitudinal center line of said plate adapted to pass mounting studs for mounting four keys two on each side of said plate by the usual holes in the heads of the keys so that they can be turned to inoperative positions along opposite sides of said plate to abut said projections.

FRANK W. CHESAK.

REFERENCES CITED

The following references are of record in the file of this patent:

UNITED STATES PATENTS

| Number | Name | Date |
| --- | --- | --- |
| 1,493,689 | Marcus | May 13, 1924 |
| 1,669,945 | Michailovsky | May 15, 1928 |
| 2,070,546 | Gits | Feb. 9, 1937 |
| 2,274,820 | Bills | Mar. 3, 1942 |
| 2,387,319 | Evans | Oct. 23, 1945 |